United States Patent
Schott et al.

(10) Patent No.: US 6,513,282 B2
(45) Date of Patent: Feb. 4, 2003

(54) SELF-CONTAINED MOBILE FUMIGATION CHAMBER SYSTEM AND METHOD

(76) Inventors: Robert Jeffrey Schott, 18011 Bowie Mill Rd., Derwood, MD (US) 20855-1614; Fred Arthur Bryant, III, 1037-B Margate Ct., Sterling, VA (US) 20164

( * ) Notice: Subject to any disclaimer, the term of this patent is extended or adjusted under 35 U.S.C. 154(b) by 0 days.

(21) Appl. No.: 09/843,763

(22) Filed: Apr. 30, 2001

(65) Prior Publication Data

US 2001/0029695 A1 Oct. 18, 2001

Related U.S. Application Data

(60) Provisional application No. 60/200,464, filed on Apr. 28, 2000.

(51) Int. Cl.[7] ............................................. A01M 13/00
(52) U.S. Cl. .......................................... 43/129; 43/125
(58) Field of Search ....................... 43/124, 125, 132.1

(56) References Cited

U.S. PATENT DOCUMENTS

| | | | | |
|---|---|---|---|---|
| 3,638,443 A | * | 2/1972 | Maurer ........................... 62/52 |
| 3,692,100 A | * | 9/1972 | Gallagher, Jr. ............... 165/29 |
| 3,721,072 A | * | 3/1973 | Clapham ....................... 55/387 |
| 3,736,792 A | * | 6/1973 | Poulsen ....................... 73/27 R |
| 4,853,241 A | * | 8/1989 | Doernemann ............... 426/320 |
| 4,859,216 A | * | 8/1989 | Fritsch ........................... 55/28 |
| 4,889,708 A | * | 12/1989 | Latif et al. .................... 424/43 |
| 5,064,447 A | | 11/1991 | Lee |
| 5,167,243 A | * | 12/1992 | Cowan et al. ............... 131/290 |
| 5,353,544 A | * | 10/1994 | Tsutsumi et al. .............. 43/125 |
| 5,662,865 A | | 9/1997 | Blatchford |
| 6,047,497 A | | 4/2000 | Smithyman et al. |

FOREIGN PATENT DOCUMENTS

| | | |
|---|---|---|
| FR | 2 154 925 | 5/1973 |
| JP | 03098888 | 4/1991 |
| JP | 06022136 | 8/1995 |

* cited by examiner

Primary Examiner—Charles T. Jordan
Assistant Examiner—Bret Hayes
(74) Attorney, Agent, or Firm—Jacobson Holman PLLC

(57) ABSTRACT

A mobile fumigation system and method is provided. The system includes a mobile fumigation chamber that is self-contained with its own power source, able to provide temperature-controlled storage on-site at a port of entry, fumigation treatment, and full transport capability. The mobile fumigation chamber also includes an integrated vapor recovery system for purifying chamber air following fumigation processing.

15 Claims, 3 Drawing Sheets

SELF-CONTAINED MOBILE FUMIGATION CHAMBER SYSTEM AND METHOD

Priority from, and the benefit of, U.S. Provisional Application No. 60/200,464, filed Apr. 28, 2000, is hereby claimed.

BACKGROUND OF THE INVENTION

1. Field of the Invention

The present invention is related to the field of fumigation and, more particularly, to a mobile temperature-controlled chamber for fumigating perishable and non-perishable goods at ports of entry or departure.

2. Description of the Related Art

Many types of perishable goods incoming to the United States from foreign locations must be inspected at the port of entry for insect contamination. In the conventional practice, the goods are off-loaded from a ship or airplane and inspected by customs and, in the United States, U.S. Department of Agriculture officials. If the presence of insects is detected, a sample insect is sent to, for example, the Smithsonian, for classification. In the event the insect has not already been introduced into the U.S., the goods bearing the insects must be fumigated to kill any remaining insects or destroyed. Accordingly, the goods, still waiting at the port of entry, are loaded onto a truck and transported to one of several fixed fumigation sites where they are unloaded and placed into a fumigation chamber. Following fumigation, the goods are reloaded onto the truck for shipment to their intended destination.

There are several problems with the conventional method. First, the goods often sit in hot warehouses at the port of entry for approximately 48 hours while the insects are identified. The insects continue to live and propagate during this period of delay. When fumigation is necessary, the goods are subjected to multiple loading and unloading sequences, i.e., onto the truck for transport, off the truck for fumigation, onto the truck for transport, etc. Furthermore, after fumigation, the goods are often reloaded onto the same truck which brought them to the fumigation site with no assurance that some of the insects did not remain in the truck when the goods were unloaded prior to fumigation. Prior to fumigation, there is no assurance that insects will not escape to the environment during transfers.

SUMMARY OF THE INVENTION

In view of the foregoing, one object of the present invention is to streamline the process of transporting and fumigating perishable goods through the use of a mobile fumigation chamber.

Another object of the invention is to provide a mobile fumigation chamber that provides temperature-controlled storage and transport to better preserve perishable goods.

A further object of the invention is to reduce the labor necessary to complete the fumigation sequence by requiring goods to be loaded and unloaded from the transporting vehicle only once.

A still further object of the invention is to provide a convenient, cost-effective, safer and more secure alternative to traditional fixed fumigation sites by allowing imported goods to be fumigated right at the port of entry, minimizing the risk of insect contamination that might otherwise occur in the areas en route to a traditional fumigation site.

Yet another object of the invention is to prevent reinfestation of insects within fumigated goods that can occur due to transport of the goods in the same truck that was originally used to haul the pre-fumigated goods to the fumigation site.

In accordance with this and other objects, the present invention is directed to a mobile fumigation chamber and method of fumigating perishable goods incoming from a foreign point of origin. The mobile fumigation chamber is self-contained, having its own power source, and provides temperature-controlled storage on-site at the port of entry as well as full transport capability. According to the present invention, perishable goods can be loaded once into the mobile fumigation chamber where they are fumigated in a temperature-controlled environment and then transported with no further handling or exposure to the elements required until reaching the ultimate point of destination.

These together with other objects and advantages which will become subsequently apparent reside in the details of construction and operation as more fully hereinafter described, reference being had to the accompanying drawings forming a part hereof, wherein like numerals refer to like parts throughout.

DETAILED DESCRIPTION OF THE PREFERRED EMBODIMENTS

Figure 1:
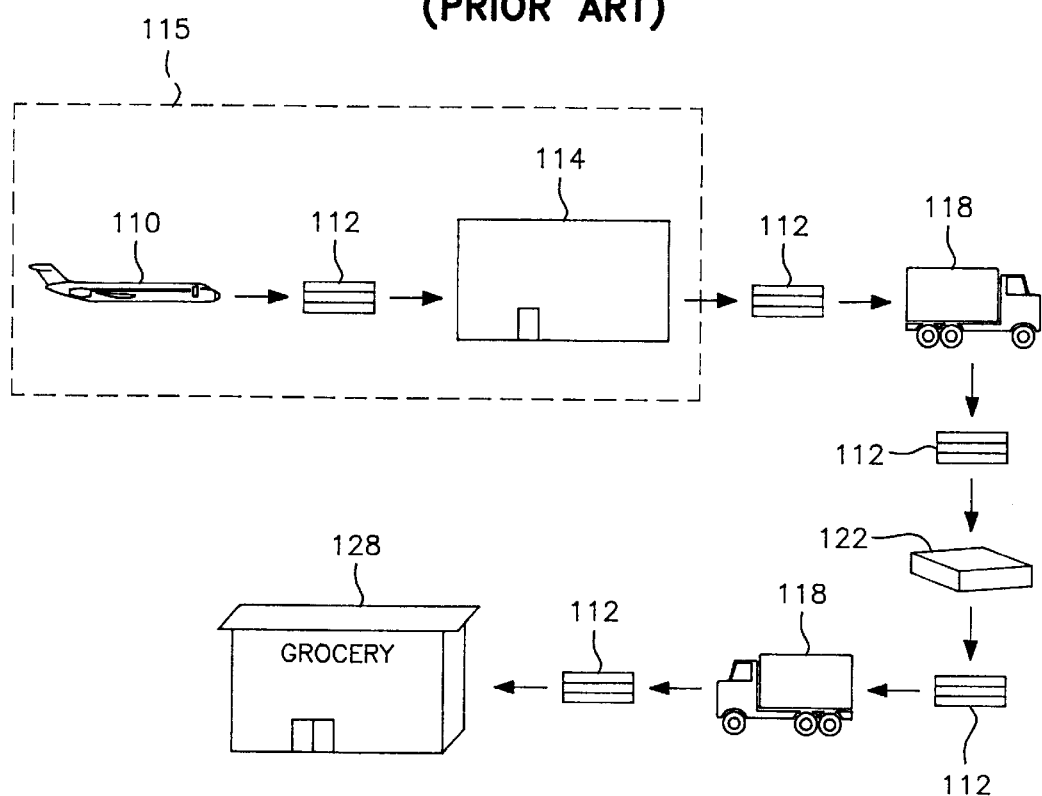
FIG. 1 shows the conventional process of moving perishable goods from a port of entry to a fumigation site and then to a final destination.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, according to conventional methods of processing perishable goods incoming from a foreign point of origin, such goods must be handled repeatedly on their journey to their ultimate destination. Goods 112 arriving in a transport vehicle 110 at a port of entry 115, which is most typically an air or seaport, are unloaded and moved into a warehouse 114 where they are inspected. If insects are present, the goods are stored in the warehouse 114 pending identification of the insects. In most cases the warehouse storage is not temperature controlled, and the process of identifying the insects can typically take on the order of 48 hours. This period of time can exact a considerable toll on perishable items during seasonal extremes, particularly in the summer.

If the goods 112 are determined to require fumigation, they are loaded onto a truck 118 for transport. Upon arrival at a fixed fumigation site, the goods 112 are unloaded and moved into a fumigation chamber 122. Following fumigation, the goods 112 are again loaded onto the truck 118, transported, unloaded and finally made available to consumers at their ultimate point of destination 128.

Figure 2:
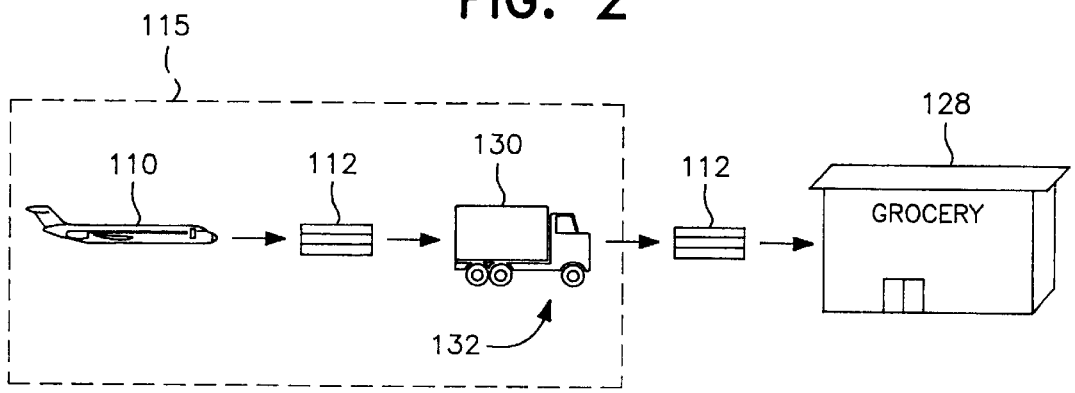
FIG. 2 shows the process of moving perishable goods with a mobile fumigation chamber, according to the present invention.

The method of the present invention is shown representatively in FIG. 2. Goods 112 arriving in a transport vehicle 110 at a port of entry 115 are unloaded and inspected and, if fumigation is indicated, they are loaded directly into a mobile fumigation chamber 130. Within the chamber, and while stationary at the port of entry 115, the goods 112 are fumigated in accordance with industry standards. Once fumigation is complete, the mobile fumigation chamber 130 is used as a transport vehicle to convey the already loaded goods 112 to their final destination 128 where the goods are unloaded.

As shown, the method of the present invention streamlines the processing of perishable goods from port of entry to final destination and, through temperature-controlled storage and transport, improves the quality of the goods made available to consumers. Through use of the present invention, shippers and importers of vegetables, fruits, flowers and other perishable products which require fumigation and temperature-controlled storage and transport are provided with all of these services at the port of entry. Goods may then be quickly and efficiently fumigated and transported with minimal handling required and with minimal exposure of the goods to potentially damaging ambient temperatures.

The mobile fumigation chamber 130 may be embodied using a refrigerated "reefer" truck and trailer, generally designated by the reference numeral 132, in which the trailer has been modified in accordance with the present invention to serve as a fumigation chamber 130 as well as a temperature-controlled storage and transport unit. However, any type of trailer unit could be used, including non-refrigerated trailers if desired. In the preferred embodiment, the trailer is a 48 foot reefer trailer with cooling as well as heating capability.

The mobile fumigation chamber 130 is self-contained, having its own means for generating the power needed to maintain temperature control and to effect fumigation. In a preferred embodiment, the means for generating power 28 may be embodied as a diesel generator. The diesel generator powers a chamber refrigeration unit 36 with fan 37, shown in FIG. 3, which is located within the chamber and is able to effectively cool the chamber. Because of its self-contained nature, the chamber 130 can be placed anywhere within or adjacent the port of entry site during fumigation with no requirement for external power or other auxiliary support. This is important in that, when undergoing the fumigation process, a specifed distance typically must be maintained between the fumigation chamber and surrounding facilities. In many cases this specifed distance is defined as a 50 foot perimeter surrounding the fumigation chamber. This perimeter is necessitated for safety reasons due to the nature of fumigants. However, the present invention, in addition to mobile fumigation capabilities, also includes structure and method whereby the fumigation chamber may be safely used in much closer poximity to surrounding facilities, as will be discussed hereinafter.

Figure 3:
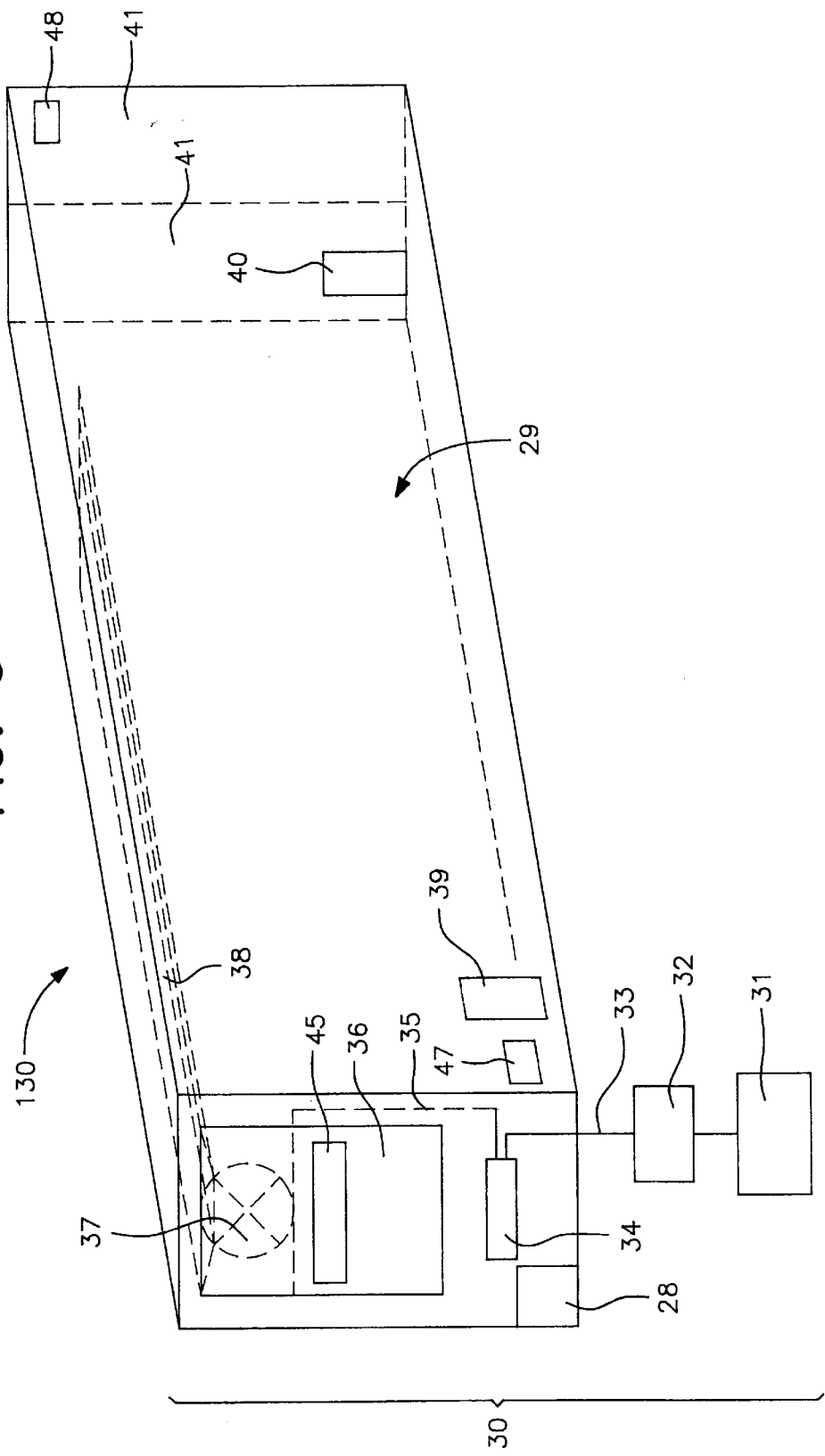
FIG. 3 is a schematic diagram of the fumigation chamber, in accordance with the present invention.

According to the preferred embodiment, representatively depicted in FIG. 3, the mobile fumigation chamber 130 is equipped with a product storage area, generally designated by the reference numeral 29, and a fumigant delivery system, generally designated by the reference numeral 30. The goods to be fumigated, which may representatively include produce or any other materials or commodities whether perishable or non-perishable, are placed in the product storage area 29 where such goods are exposed to a selected fumigant through the action of the fumigant delivery system 30.

A well known fumigant which may be used in conjunction with the present invention is methyl bromide. When using methyl bromide, the fumigant delivery system includes a heat exchanger unit 34. The heat exchanger unit is used to transform liquid methyl bromide into a gaseous state which is then introduced to the chamber. Other fumigants may also be used, as would be known by persons of ordinary skill in the art.

More particularly, the fumigant delivery system 30 includes a fumigant storage cylinder 31, volumetric measurement unit 32 and heat exchanger 34. The volumetric measurement unit 32, which is used to control the amount of fumigant passed to the chamber from the storage cylinder 31, is connected to the heat exchanger 34 via a line 33. In the case of methyl bromide, the line 33 is a liquid line as the methyl bromide is stored as a liquid in the cylinder 31. The heat exchanger 34 heats the methyl bromide to approximately 150° F., converting the liquid to a gaseous state. The methyl bromide gas is then introduced into the chamber through manifold 35. The manifold 35, which is located inside the chamber, may be embodied as a pipe provided with suitable apertures to allow gas flowing into the manifold to be vented therethrough.

The refrigeration unit 36 of the chamber is equipped with a circulation fan 37 which sweeps up the incoming methyl bromide gas and disperses it into the product storage area 29 of the chamber. In a preferred embodiment, the circulation fan 37 operates at approximately 3500 cubic feet per minute (CFM). At this level of operation, and given a chamber size of approximately 3250 cubic feet, effective dispersal of the methyl bromide may be completed in approximately 10 minutes. Other fan speeds and chamber sizes may, of course, be accommodated with suitable adjustments in dispersal time.

When the chamber 130 is embodied using a reefer truck 132, the truck is equipped with an air recirculation system, powered by a diesel generator. Air, which may be cooled or heated, is directed along a duct 38 on the inside of the trailer unit, typically from the front or "nose end" adjacent the fumigant delivery system 30, until it reaches the rear of the trailer adjacent the cargo loading doors 41, where the air is then pulled back toward the front. The recirculated air is directed rearward across the top of the trailer and then pulled forward along the trailer's typically corrugated flooring. Fumigant is circulated throughout the trailer along with the already ongoing flow of interior air until fumigant concentration has reached equilibrium. As noted, this can typically be achieved in approximately 10 minutes, but will vary with fan speed and chamber size.

Once the fumigant has been effectively dispersed throughout the chamber, the fan 37 is shut off, beginning the exposure period of the goods inside the chamber. The exposure period generally takes from two to four hours.

In some cases, fumigation may be carried out without heating or cooling of the product storage area 29 but simply using the blower capability of the air recirculation system as a fan. Perishable items stored in the chamber may be cooled until fumigation commences. Prior to fumigant introduction through the manifold, all weep holes and other openings in the chamber are sealed so that the chamber remains at normal atmospheric pressure and is leak free in accordance with federal fumigation standards. While cooling may continue throughout the fumigation process with the weep holes sealed, in some cases moisture created by the cooling process, which would otherwise be allowed to escape through the weep holes, may be trapped within the chamber and exceed desirable levels. Accordingly, cooling may be suspended during fumigation and then resumed upon completion. In view of the insulated and sealed nature of the chamber, this presents no real drawback as temperature can be virtually maintained for the exposure time period required to complete fumigation, which again is typically two to four hours.

Once the exposure period is completed, it is necessary to remove the fumigant vapor from the chamber. One technique is to open the exhaust fan opening 39 and the exhaust intake opening 40. The exhaust fan within the exhaust fan opening 39 typically operates at about 300 CFM. Upon opening the intake opening 40, the exhaust fan and the chamber recirculation fan 37 are activated. Air is drawn into the chamber through the intake opening 40 and the chamber air is exhausted through the exhaust opening 39. The drawback to this technique is that the fumigant is not removed from the air before the air is expelled into the atmosphere, thus necessitating the 50 foot safety perimeter requirement to which previous reference was made.

A preferred embodiment of the present invention includes a vapor recovery system 45 that removes the fumigant gases before the chamber air is exhausted into the atmosphere. The basic components of the vapor recovery system as implemented with the fumigation chamber are set forth in FIG. 4. While specific materials and sizes will be discussed in connection with the illustrative embodiment shown in FIG. 4, it is to be understood that these are representative only and the invention is not limited to these particular materials and dimensions.

The vapor recovery system (VRS) 45 is mounted inside the chamber and includes at least one carbon absorption unit 16. In the embodiment shown in FIG. 4, two carbon absorption units 16 are serially connected by hose 8. The hose 8 may have an inside diameter of approximately 6" and may be made of PVC/fiberglass or other suitable material.

The air inlet 47 is connected close to the floor of the chamber, preferably within about 12" thereof, and adjacent the nose end of the trailer. The air outlet 48 is located close to the ceiling of the chamber, preferably within 2–4" thereof, and adjacent the rear of the chamber, nearest the cargo loading doors 41. Each inlet has a screen 1 and damper actuator 3, which may be electrically operated.

A VRS fan 6 draws air in through the air inlet 47 and to the carbon absorption units 16. The VRS fan 6 is connected to the air inlet 47 through reducer 4, and PVC/fiberglass hose 5 with worm drive hose clamps 7. In a preferred embodiment, the hose 5 has an inside diameter of about 7". The VRS fan should have a motor with at least two horsepower and preferably operate at about 300 CFM.

Air pushed into the first carbon absorption unit 16A enters the inlet distributor tube 49 through inlet 9A and proceeds horizontally through the carbon bed 50 to the free airspace 51 inside the unit wall. The purified air then travels upward where it exits through outlet 9B. The carbon absorption unit may be embodied using a vapor scrub radial flow unit made by Cameron/Great Lakes, Inc. A preferred embodiment incorporates Model VS55-165R, although other models having comparable characteristics could also be employed.

Untreated air is sampled as Su through sample port 18. Air that has passed through the carbon bed 50 of the first absorption unit 16A is sampled as S1 through tubing 17A. Air that has been "scrubbed" by the first absorption unit 16A is output to the second absorption unit 16B where the scrubbing operation is repeated. Air that has passed through the carbon bed 50 of the second absorption unit 16B is sampled as S2 through tubing 17B. The output of the second absorption unit 16B is directed to the air outlet 48 through reducer 10, PVC pipe components 11, 12, 13, rubber coupling 14 and airflow damper 15.

According to the present invention with the vapor recovery system in place, when the exposure period has been completed, the exhaust fan opening 39 and exhaust intake opening 40 remain closed. Fan 37 is activated, along with VRS fan 6. Fan 37 begins circulation within the chamber which directs air into the air inlet 47 located near the floor of the chamber. VRS fan 6 pushes incoming air through the absorption units 16 after which the carbon purified air is returned to the chamber through air outlet 48. Circulation continues through the vapor recovery system until incoming "untreated" air sampled as Su through port 18 is at or below a threshold value indicating the air to be sufficiently clean. While time required may vary, the vapor recovery system using the representative fans and chamber size is typically able to clean the chamber air sufficiently for safe return to the atmosphere within 10 to 15 minutes. By thus efficiently and effectively cleaning the chamber air before its return to the atmosphere, the present invention with the vapor recovery system obviates the prior art requirement for a 50 foot safety perimeter, providing the mobile fumigation chamber of the present invention with even greater versatility and adaptability over prior art techniques.

Figure 4:
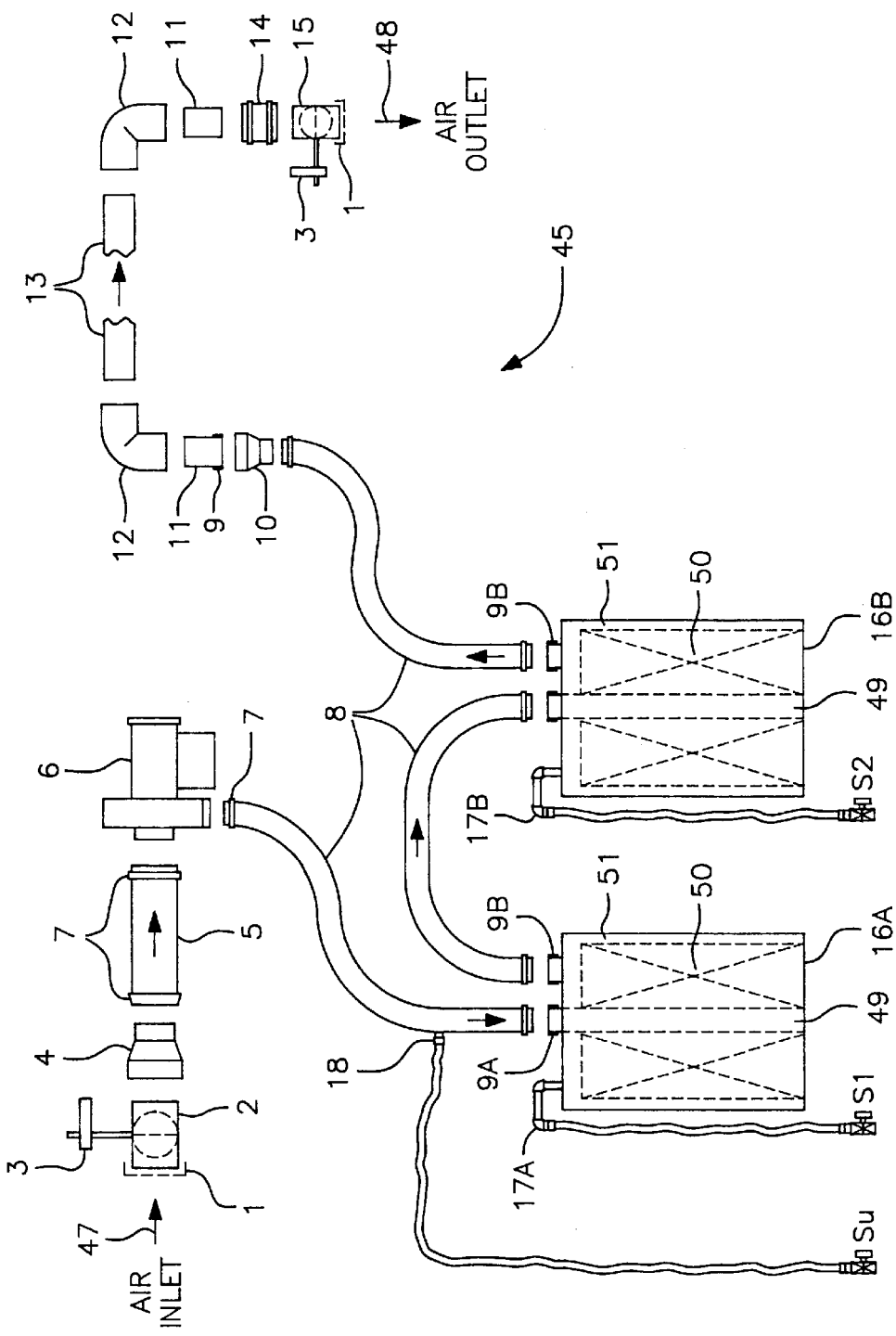
FIG. 4 illustrates an embodiment of the vapor recovery system used in conjunction with the mobile fumigation system, in accordance with the present invention.

As described, the embodiment shown in FIG. 4 has two carbon absorption units 16. The vapor recovery system would be fully operational with only one unit, or could include three or more units. The samples taken at S1 and S2 allow the efficiency of each absorption unit to be evaluated. When the first absorption unit 16A is new and fully functional, the sample taken at S1 should show nearly zero fumigant contamination, and the sample at S2 should even more likely indicate zero remaining contamination. As the first unit 16A becomes saturated, more fumigant will remain to be detected at S1, indicating that the first unit 16A is nearing saturation. The present invention includes a bypass function, not shown, whereby air incoming through air inlet 47 is passed directly to the second absorption unit 16B, bypassing the first unit 16A, so that the first unit can be replaced with another unit. In this way, there is no down time required when the system is implemented with two absorption units, as the vapor recovery system can continue to fully operate even while one of the carbon absorption units is replaced.

The mobile fumigation chamber may also be embodied using other trailer types, either with or without temperature-control capabilities. A fan or other air circulation means is needed within the trailer to distribute the fumigant in accordance with federal standards, and the trailer must be able to withstand a specified pressurization for a specified period of time, also in accordance with federal fumigation standards. The present invention is intended to include such embodiments. The preferred embodiment, however, is as has been described, namely a reefer trailer with air delivery system capable of heating and cooling, with a fumigant delivery system that works cooperatively with the air delivery and circulation system. Preferably the system includes a vapor recovery system within the chamber as has been described. The resulting system is mobile, self-contained, and provides an optimal environment for storing, treating and transporting perishable products.

The foregoing descriptions and drawings should be considered as illustrative only of the principles of the invention. The invention may be configured in a variety of shapes and sizes and is not limited to the structures of the preferred embodiment. Numerous applications of the present invention will readily occur to those skilled in the art. Therefore, it is not desired to limit the invention to the specific examples disclosed or the exact configuration and operation shown and described. Rather, all suitable modifications and equivalents may be resorted to, falling within the scope of the invention.

What is claimed is:

1. A mobile self-contained fumigation system comprising:
   a fumigation chamber with a product storage area for accommodating goods requiring fumigation processing;
   a refrigeration unit for cooling the chamber, the refrigeration unit including a circulation fan and air ducts along a top portion of the chamber for circulating air throughout said chamber;
   a power supply for powering the refrigeration unit;
   a fumigant delivery system integral with said chamber and including,
      a heat exchanger unit for transforming liquid fumigant into a fumigant gas;
      a fumigant gas manifold for transferring fumigant gas from the heat exchanger unit to said product storage area, said manifold having apertures through which fumigant gas is released into the chamber, whereby the circulation fan forces air with fumigant gas as a mixed gas through the air ducts along the top portion of said chamber for dissemination throughout the chamber; and
      a vapor recovery system integral with said chamber for removing fumigant from said mixed gas upon completion of fumigation processing using at least one carbon absorption unit.

2. The system as set forth in claim 1, said vapor recovery system including a plurality of carbon absorption units.

3. The system as set forth in claim 1, wherein the fumigation chamber is a refrigerated trailer.

4. The system as set forth in claim 3, wherein said fumigant delivery system is located at a front end of said trailer adjacent said refrigeration unit, said vapor recovery system including an air inlet located at said front end at a level beneath said refrigeration unit, and an air outlet located at a rear end of said trailer proximal to said top portion.

5. The system as set forth in claim 2, wherein said vapor recovery system includes two carbon absorption units connected serially, each carbon absorption unit including respective output tubing for collecting a sample of gas purified by said respective unit to evaluate unit efficiency.

6. The system as set forth in claim 1, said vapor recovery system including a port for collecting a sample of mixed gas prior to entry of said mixed gas into said carbon absorption unit, said sample indicating remaining fumigant levels in said mixed gas.

7. A mobile, self-contained fumigation chamber for effecting fumigation processing and vapor recovery comprising:
   a product storage area for accommodating goods requiring fumigation processing;
   a circulation fan;
   a fumigant delivery system including a heat exchanger unit for heating a supply of liquid fumigant to transform said liquid fumigant into a fumigant gas and a manifold element for transferring the fumigant gas from said heat exchanger unit to said product storage area, said circulation fan forcing said fumigant gas throughout said chamber; and
   a vapor recovery system integral with said chamber and mobile therewith for removing fumigant from air within said chamber upon completion of fumigation processing.

8. The chamber as set forth in claim 7, wherein said vapor recovery system includes a carbon absorption unit.

9. The chamber as set forth in claim 7, wherein said vapor recovery system includes a plurality of carbon absorption units.

10. The chamber as set forth in claim 9, wherein said vapor recovery system includes two carbon absorption units connected serially, each carbon absorption unit including respective output tubing for collecting a sample of gas purified by said respective unit to evaluate an efficiency of said unit.

11. The chamber as set forth in claim 7, wherein said chamber is a refrigerated trailer having a refrigeration unit, said fumigant delivery system being located at a front end of said trailer adjacent said refrigeration unit, said vapor recovery system including an air inlet located at said front end at a level beneath said refrigeration unit, and an air outlet located at a rear end of said trailer proximal to said top portion.

12. The chamber as set forth in claim 11, wherein said vapor recovery system is located adjacent said refrigeration unit.

13. The chamber as set forth in claim 8, wherein said vapor recovery system includes a vapor recovery fan coupled to said carbon absorption unit, said vapor recovery fan directing circulating air from said chamber to said carbon absorption unit for purification.

14. The chamber as set forth in claim 7, wherein said chamber includes a power generating device for powering said fumigation processing and vapor recovery.

15. The chamber as set forth in claim 14, wherein said power generating device is a diesel generator.

* * * * *